United States Patent [19]

Chang

[11] Patent Number: 5,560,332
[45] Date of Patent: Oct. 1, 1996

[54] CONNECTION ROD AND PISTON FOR RECIPROCATING MOVEMENT APPARATUS

[75] Inventor: Kyong T. Chang, 102-2001, Chulsan Hanshin Apt. 367, Chulsan Dong, Kwang Myong, Kyonggido, Rep. of Korea

[73] Assignees: Kyong Tae Chang; Chang Heui Nam, both of Kyonggido; Ja Kwan Koo, Seoul; Kye Hwan Kim; Woo Sub Song, both of Kyonggido, all of Rep. of Korea

[21] Appl. No.: 296,650

[22] Filed: Aug. 26, 1994

[30] Foreign Application Priority Data

| Aug. 28, 1993 | [KR] | Rep. of Korea | 1993-16915 |
| Sep. 28, 1993 | [KR] | Rep. of Korea | 1993-20189 |
| Nov. 13, 1993 | [KR] | Rep. of Korea | 1993-24145 |

[51] Int. Cl.$^6$ ............................................. F02B 75/32
[52] U.S. Cl. ............................................. 123/197.3; 74/44
[58] Field of Search ............................. 123/197.3, 197.4, 123/197.2; 74/44; 403/361

[56] References Cited

U.S. PATENT DOCUMENTS

| 4,777,845 | 10/1988 | Miller | 123/197.4 |
| 4,803,964 | 2/1989 | Kurek et al. | |
| 4,890,588 | 1/1990 | Tillman | |
| 4,899,705 | 2/1990 | Reed | |
| 4,957,069 | 9/1990 | Mederer | |
| 4,974,554 | 12/1990 | Emery | |
| 5,040,502 | 8/1991 | Lassiter | |
| 5,042,442 | 8/1991 | Laskaris et al. | |
| 5,203,228 | 4/1993 | Miyawaki et al. | 123/197.4 |
| 5,247,873 | 9/1993 | Owens et al. | 74/44 |
| 5,427,067 | 6/1995 | Horiuchi | 123/197.3 |

*Primary Examiner*—Marguerite McMahon
*Attorney, Agent, or Firm*—Flynn, Thiel, Boutell & Tanis, P.C.

[57] ABSTRACT

In an internal combustion engine with a reciprocating movement which uses gasoline, diesel fuel or other fuels to generate forces when fuels attain explosive combustion, the piston is pushed in the inner cylinder. The motion of the piston with the reciprocating movement (straight motion) is transferred to a crank shaft having rotation motion, or the rotation motion of the crank shaft is transferred to the piston having straight motion (reciprocating movement). By such transfer, in order to use in compressed feed for fluids, when the connecting rod is provided with a universal joint type and a ball joint type, although the relative position errors and right angle are staggered within a given range, abnormal friction, noises and vibrations never take place. Accordingly, pollutions such as noise, vibration and noxious exhaust gases are dramatically reduced, fuels are surprisingly and significantly saved, and the life of the machine is doubly increased. Further, the piston is divided into a crown part and a skirt part, and the crown part is used with a piston ring in a conventional way. However, the skirt part is attached to a metal roller mounted on a metal bracket, or a metal plate or spring, and the piston is provided with an expansion property. Accordingly, the gap or clearance between the cylinder and the piston is completely removed, and maximum smoothing motion takes place when the piston is moved up and down. By such smoothing action of the piston, a state without tilt and slap is realized.

2 Claims, 17 Drawing Sheets

FIG 17(A)  FIG 17(B)
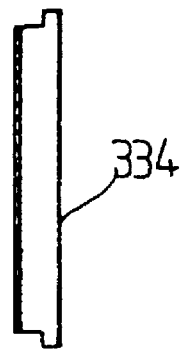 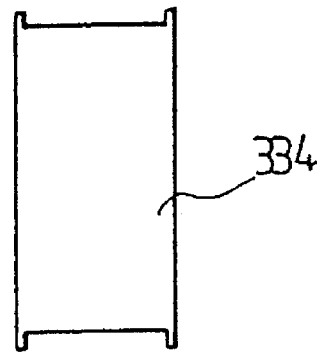
FIG 17(C)

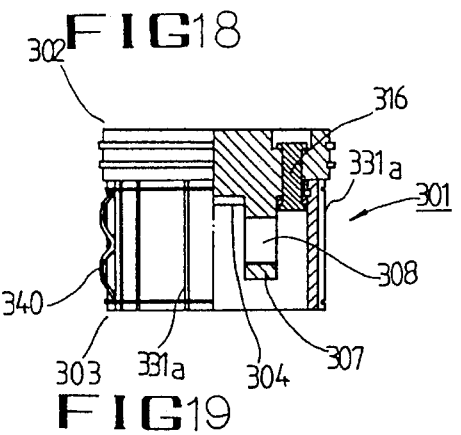
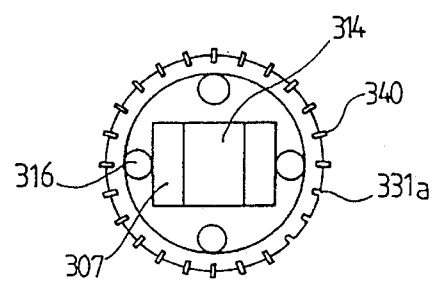
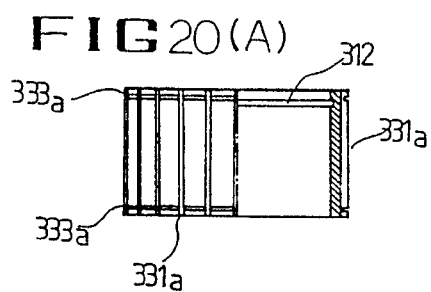
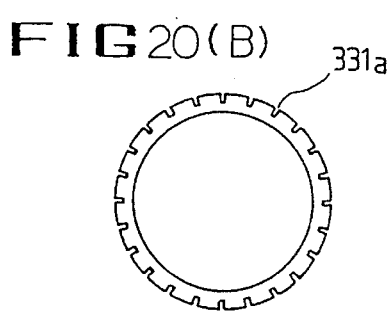
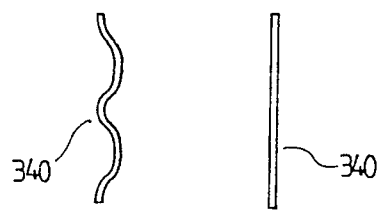

CONNECTION ROD AND PISTON FOR RECIPROCATING MOVEMENT APPARATUS

FIELD OF THE INVENTION

The present invention relates to a connecting rod and piston for a reciprocating movement apparatus combining a universal joint type connecting rod and a ball joint connecting rod for an internal combustion engine and pump with reciprocating movement and a self-aligning type flexible piston.

BACKGROUND OF THE INVENTION

In prior art, as shown in FIGS. 29 and 30, the force of the piston 1, which is reciprocably moved in the cylinder 11 of a cylinder head 10, is transferred to a crank-pin 7 through a piston-pin 9 and a connecting rod 8, so that a crank shaft 2 is rotated by the transferred force.

A connecting rod cap 6, which facilitates such a basic movement, has a function for encompassing the crank pin 7, and a connecting rod cap bolt 5 fixedly clamps the connecting rod 8 and the connecting rod cap 6. Further, a counter-weight 3 is dynamically acted on by inertia, and by a crank shaft web 4 the connecting rod 8 is prevented from axial movement on the crank pin 7.

In such structures, the connecting rod 8 has gaps 15 in the connecting part coupled to the piston 1 and the piston pin 9, so that any relative position error between the cylinder block and the crank shaft 2 is compensated. Such a function has a compensation by slipping, and bending for the connecting rod is always induced. Accordingly, noises are produced and fuels are spent wastefully. In addition, the gaps 15 are possibly compensated only relative to the position error for a direction parallel with only the crank shaft 8, and as to a position error for the other direction the compensation is not made.

In accordance with such structures, when the piston 1, the connecting rod 8 and the crank shaft 2 are completely assembled, in case relative positions and relative angles on the above three components 1, 2, and 8 are not exactly aligned, severe friction take place on the mutual connection parts, and great noises and severe vibrations occur. Accordingly, there have been drawbacks in that the fuels are spent wastefully and the apparatuses are rapidly worn away.

Thus, when the engine is practically manufactured, in order to compensate the error occurring in all directions of a solid angle 360° (4πω angle), the piston diameter is always formed smaller than the cylinder diameter, and it is used without any changes, maintaining the great gaps.

As described above, in order to reduce leakage of the fuels in the broad gap between the cylinder and the piston and to inhibit introduction of the engine oil into the combustion chamber, various piston rings have been used.

Although these piston rings have reduced leakage of fuels and penetration into the combustion chamber of the engine oil, the mutually turbulent strikes, which take place owing to the broad gaps between the piston and the cylinder, are not able to be removed, and they result in an unnecessary excess of vibration and noise in the engines, abnormal abrasion in the parts, wastes of fuels, pollution, etc.

Further, allowable error limit through the working procedures of the crank shaft is ultimately not able to be minimized, owing to making the connecting rod as a rigid body, and manufacture for the crank shaft is difficult.

Accordingly, the crank shaft machining apparatuses are abnormally expensive, and problems which have reduced production-yields have taken place.

In addition, in the internal combustion engines with reciprocating movement which have been used the piston generally, and in the reciprocating movement pumps which have used the piston, the piston 1 has a solid, rigid body. In order to prevent fixation during insertion into the cylinder 11 of the piston, due to the thermal expansion and construction, the outer diameter of the piston 1 has been manufactured smaller than the inner diameter of the cylinder 11.

Accordingly, very broad gaps have been formed between the piston 1 and the cylinder 11.

As described above, such conventional structures have broad gaps formed at random between the cylinder 11 and the piston 1. In case these gaps are not filled up by the proper methods, the compressible fuels or gases all leak away through the gaps, and original functions for the cylinder 11 and the piston 1 could not be realized.

Thus, in order to prevent leakage in excess and to increase efficiency, in the compressible fuels and gases, deep and narrow grooves on the upper periphery of the piston, the so-called "crown" are machined through all the circumference.

As a result of machining grooves in the circumference, piston rings are inserted into the grooves and prevent leakage of the gases from the gaps between the cylinder 11 and the piston 1.

Therefore, the practical structures of the piston 1, constructed as described above, and the pistons 1 which have been used throughout the world at the present time, never carry out the practical piston functions, that is, fluid compressible functions, and conduct only the piston ring transporting action.

Further, a low part of the piston, the so-called "skirt part", has an object in maintaining contact at the right angle between the cylinder 11 and the piston ring. However, as described above, owing to the broad gap or clearance between the cylinder and the piston, when the piston is moved up and down the piston orientation is changed and causes the phenomenon of moving slantwise left and right, the so-called "tilt", and the phenomenon of so-called "slap" in which the cylinder is struck by the piston. The tilt phenomenon and the slap phenomenon produce three bad influences on the engine as follows:

a) Whenever the piston motion is changed in the progressive directions up and down, noises take place one time owing to the impact of the slap strike.

b) Whenever the piston motion is changed in the progressive directions up and down, pivot functions of the piston rocking movement are carried out in the state to fit the piston ring in the groove at the moment the tilt motion takes place, and at the same time the cylinder wall and the contact angle of the piston ring are recontrolled. At the same time, the piston tilt motion has no mono-centric rocking, and has poly-centric rocking. Accordingly, although there are short moments, an original position returning phenomenon takes place, twisting all the piston rings. At this time, a phenomenon of rotating in any direction takes place, sliding within the groove in the piston ring.

Such great energy-consuming combined phenomena have a very small input and take place only at the top dead center and the bottom dead center positions, depending upon only the inertia of the inertia rotation. Accordingly, they produce greatly bad influences on the homogeneous output of the engine.

c) The piston ring carries out sliding movement in the groove slowly at any directions, changing continuously the contact angle between the piston ring and the cylinder wall through the tilt motion. Accordingly, the corner angle of the piston ring which is required for the piston ring becomes blunt slowly along all the circumference of the piston ring, and at the moment the piston ring returns to the original position, maximum pressure on the top dead center is distributed. As a result of the distribution for the pressure, leakage amount of the compressible gases has a maximum value. As described above, in the influences on the engine, the tilt phenomenon and the slap phenomenon in the piston produce vibration, noises and fuel losses when the engine is rotated at a high speed.

SUMMARY OF THE INVENTION

It is an object of the present invention to solve the above-listed problems, and to significantly reduce pollution such as noises, vibration and bad exhaust gases, and at the same time to significantly increase saving of fuels and life of the machines, owing to no occurrence of abnormal friction, noises and vibration, although the relative position and the right angle between the piston and the crank shaft are staggered within the given range in case the connecting rod is provided with the universal type joint.

It is another object of the present invention to reduce dramatically the pollutions such as noises, vibration and bad exhaust gases, and at the same time to significantly increase saving of the fuels and life of the machines, owing to no occurrence for abnormal friction, noises and vibration within the given range, although the relative position and right angle between the position and the crank shaft are mutually staggered in case the connecting rod is provided with the ball joint type.

It is a further object of the present invention to divide the piston into a crown part and a skirt part, in which the crown part uses a piston ring as in the conventionally existing way and the skirt part is provided as an elastic metallic plate, a spring or a metallic roller mounted on an elastic metallic bracket, whereby they provide expansibility and any gap or clearance between the cylinder and the piston is completely removed. By forming the condition where no occurrence of the tilt phenomenon and the slap phenomenon take place, maximum smoothing movement in the up and down movement of the piston results, not only to form the condition with no occurrence for vibration and noises by the tilt and slap, but also to reduce the vibration and noises in the engine and the compressor by reaching nearly zero in the amount of leakage for the compressible fuels or gases, and to significantly accomplish increased efficiency for the compressor and fuel saving for the engine.

A connecting rod and piston for a reciprocating movement apparatus are combined with a universal joint type connecting rod and a ball joint connecting rod for an internal combustion engine and a pump with reciprocating movement. A piston carrying out straight line movement (reciprocating movement) pushing the piston in the interior of the cylinder due to forces occurring when fuel attains explosive combustion in the reciprocating movement type internal combustion engine using gasolines, diesel fuel and other fuels, transfers the straight line movement (reciprocating movement) to the crank shaft carrying out the rotary movement, or the piston carries out straight line movement (reciprocating movement) in response to the rotary movement of the crank shaft. As in the compressor and the piston with the reciprocating movement, fluid compressed feed is able to be used, and a self-aligning type flexible-piston in which the piston is divided into a crown part and a skirt part, the crown part having piston rings in the conventional way, and the gap or clearance between the cylinder and the piston being completely removed by providing flexibility to a piston diameter, through provision of a metallic roller or the like on an elastic metallic bracket, an elastic metallic plate, or a spring in the skirt part.

BRIEF DESCRIPTION OF THE DRAWINGS

The connecting rod and piston for reciprocating movement apparatus according to the present invention will be described in detail with reference to embodiments shown in the accompanying drawings, in which:

FIG. 9 is a crown part of the apparatus of FIG. 6, in which

FIG. 11 is a riveting—disk part of the apparatus of FIG. 6, in which

FIG. 12 is a stop—ring of the apparatus of FIG. 6, in which

FIGS. 13 to 17 show a fourth embodiment according to the invention, in which FIG. 13 is a partly sectional end view of the third embodiment;

FIG. 14 is a bottom view of the apparatus of FIG. 13;

FIG. 15 shows a skirt part of the apparatus of FIG. 13, in which

FIG. 16 shows a blade holder—ring of the apparatus of FIG. 13, in which

FIG. 17 shows a metal contactor blade of the apparatus of FIG. 13, in which FIG. 17(A) is a sectional side view, FIG. 17(B) is a front view, and FIG. 17(C) is a top view;

FIGS. 18 to 21 show a fifth embodiment of the present invention, in which FIG. 18 is a partly sectional end view of the fifth embodiment, FIG. 19 is a bottom view of the apparatus of FIG. 18, FIG. 20 shows a skirt part of the apparatus of FIG. 18, with FIG. 20(A) being a partly sectional view and FIG. 20(B) being a bottom view, and FIG. 21 shows a contactor spring of the apparatus of FIG.

18, in which FIG. 21(A) is a side view, FIG. 21(B) is a front view, and FIG. 21(C) is a top view.

FIGS. 22 to 27 show a sixth embodiment of this invention, in which FIG. 22 is a partly sectional end view of the sixth embodiment; FIG. 23 is a bottom view of the apparatus of FIG. 22; FIG. 24 shows a roll mount—disk of the apparatus of FIG. 22, in which FIG. 25 is a sectional view of a roll train bracket of the apparatus of FIG. 22, which rotatably supports a contactor—roller; FIG. 26 is a sectional view of the contactor—roller; and FIG. 27 shows a pivot—pin of the apparatus of FIG. 22;

DETAILED DESCRIPTION

Figure 1:
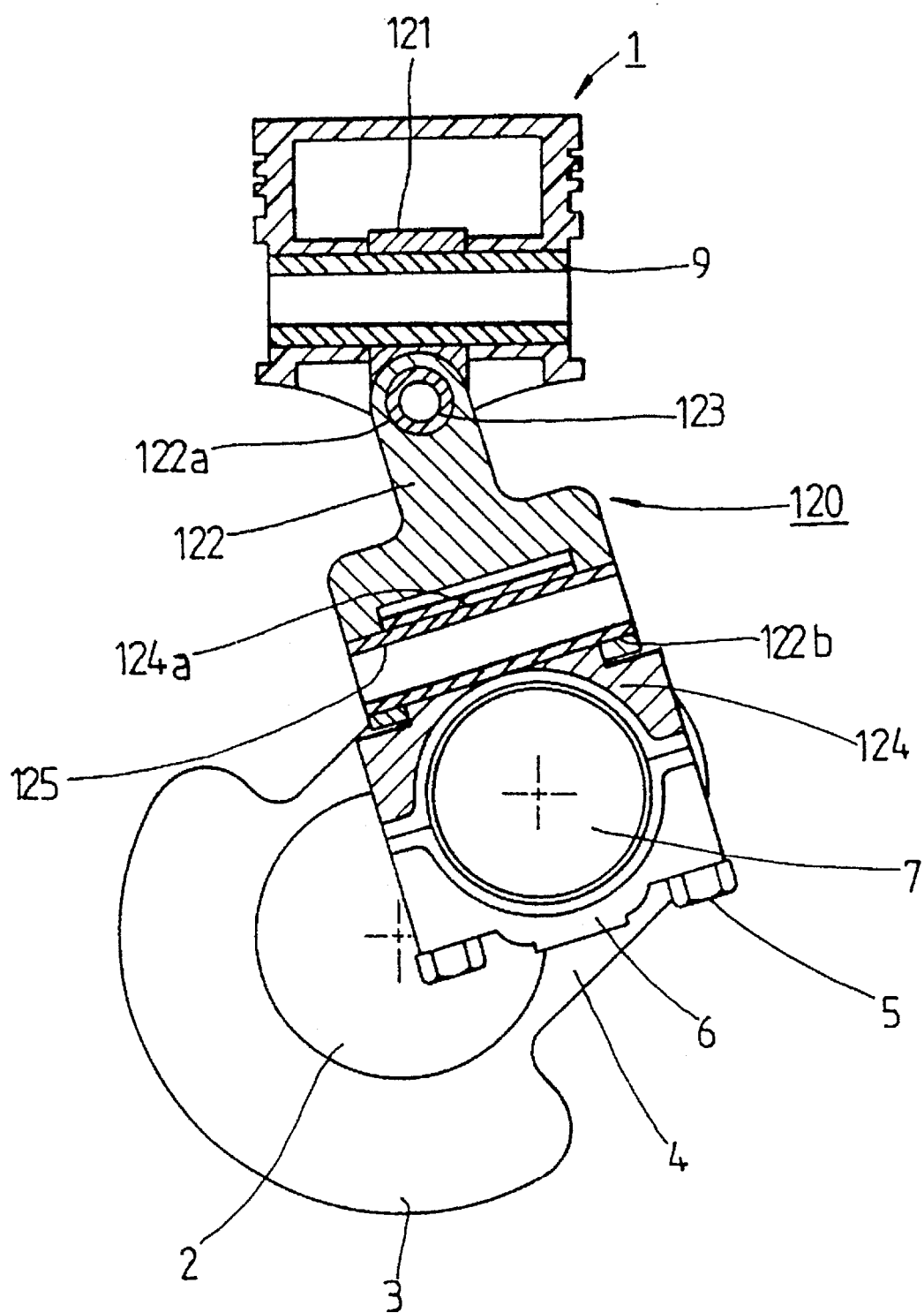
FIG. 1 is a sectional end view of a first embodiment of the apparatus according to the present invention.

In the drawings, reference numeral 120 (FIG. 1) indicates a universal joint connecting rod in a first embodiment of the invention. The universal joint connecting rod 120 includes a universal joint upper link 121 which is pierced by an upper pin hole 121a so as to be pivotally coupled to the piston 1 in a cylinder head 10 by a piston pin 9, and a lower pin hole 121b of the universal joint upper link 121 and an upper pin hole 122a of a spider 122 are pivotally coupled by a universal joint upper pin 123. Further, a lower pin hole 122b of the spider 122 is united with an upper pin hole 124a of a universal joint lower link 124 by a universal joint lower pin 125. And then the universal joint lower link 124 and the connecting rod cap 6 of the universal joint connecting rod 120 are pivotally fitted around a crank pin 7 of the crank shaft 2 and are clamped together by a connecting rod cap bolt 5.

Accordingly, the relative position error between the piston 1 and the crank shaft 2 is compensated.

Figure 4:
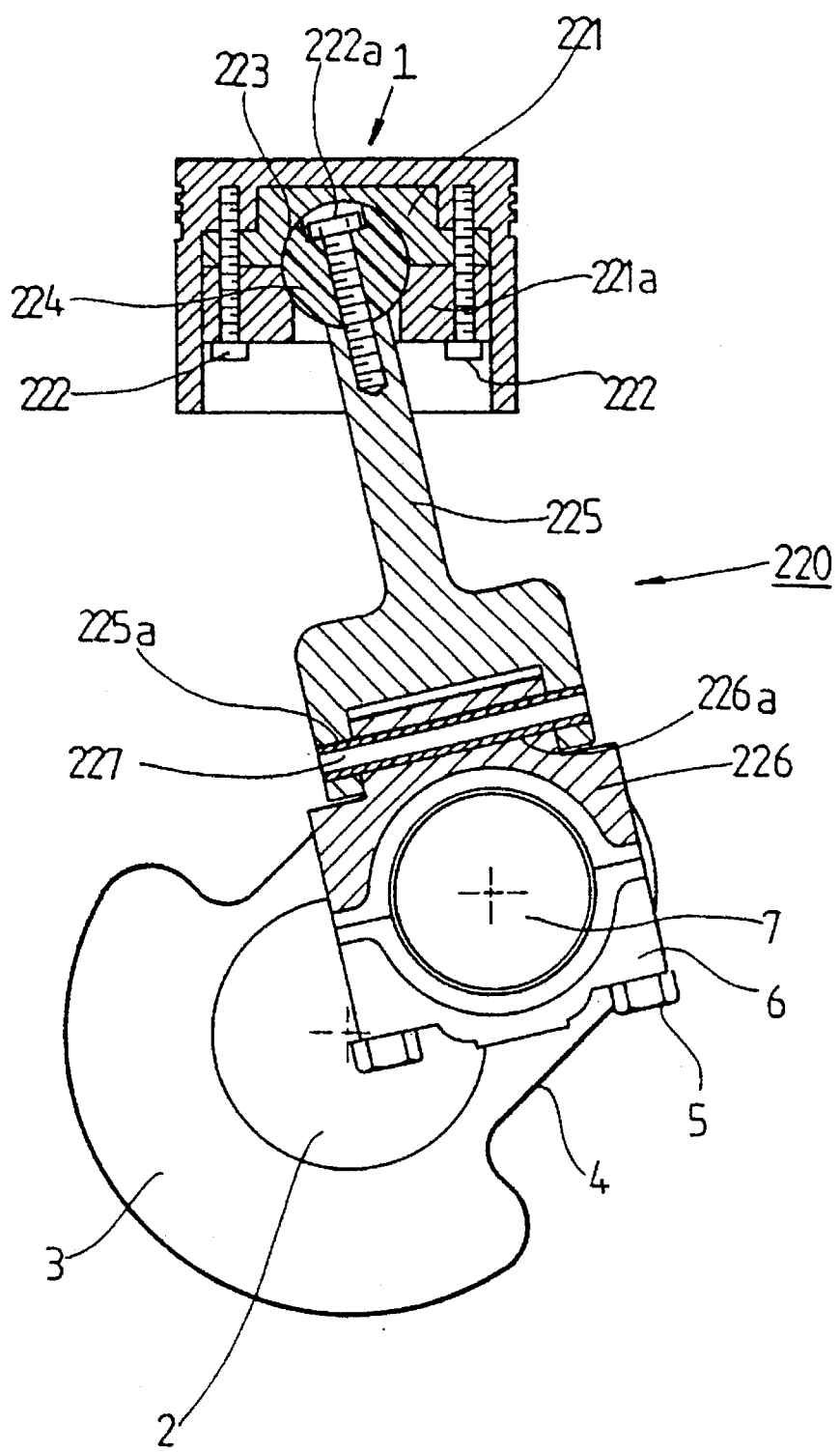
FIG. 4 is a sectional end view of a second embodiment of the invention.

Now, a second embodiment of the present invention will be described in detail with reference to FIGS. 4 and 5. Reference numeral 220 designates a ball joint connecting rod. The piston 1 in cylinder 11 includes upper and lower receptacles 221 and 221a, and the ball joint connecting rod 220 includes a ball body 224 which is movable in a groove or socket 223 of the receptacles 221 and 221a, and which is fixed on a spider 225 with a fixed bolt 222a.

A lower hole 225a of the spider 225 is united with an upper pin hole 226a of a lower link 226 by a lower pin 227. The lower link 226 and the connecting rod cap 6 are pivotally fitted around the crank pin 7 of the crank shaft 2, and a connecting rod cap bolt 5 fixedly clamps them together. Accordingly, the relative position error between the piston 1 and the crank shaft 2 is compensated.

A third embodiment of the present invention will be described in detail with reference to FIGS. 6 to 12.

Reference numeral 301 designates a piston, and the piston 301 has a crown part 302, a skirt part 303 and a riveting disk 304 which is united with the crown part 302 and the skirt part 303.

Two or three grooves 305 are formed on the outer circumference of the upper end on the crown part 302 of the piston 301 and a piston ring 306 is inserted in each groove 305. On the bottom, a pin hole 308 pierces each of two downwardly projecting arms 307 which together define a clevis, and through the upper end of crown part 302 are vertical rivet holes 309.

In addition, a plurality of flexible tension blades 310 are formed longitudinally on the outer circumference of the skirt part 303, and along the leading end of each tension blade 310 a contactor—ridge 311 is formed. On the inner circumference of the piston a groove 313 is formed so as to receive a stop ring 312.

The riveting disk 304 is centrally pierced by a square hole 314. Riveting holes 315, corresponding to respective riveting holes 309, extend through the crown part 302 near the outer circumference, and the parts 302 and 304 are united with rivets 316.

Next, a fourth embodiment of the present invention will be described in detail with reference to FIGS. 13 to 17.

The piston 301 of the fourth embodiment includes a crown part 302, a skirt part 303 and a riveting disk 304 which is used to unite the crown part 302 with the skirt part 303, and the crown part 302 and the riveting disk 304 have same structures and same reference numerals as in the fourth embodiment, so the description for them is omitted.

A plurality of blade fit grooves 331 are formed longitudinally in the outer circumference of the skirt part 303, and two grooves 333 are formed to be circumferentially fitted with blade holder rings 332 on the outer circumferences of the upper and lower ends.

A contactor blade 334 to be fitted in the blade fit groove 331 of the skirt part 303 is formed with a shape of substantially a "dish".

More specifically, each contactor blade 334 is made from a piece of bent sheet metal having a slightly curved web 334A and two generally parallel legs 334B and 334C which project outwardly from opposite sides of the web. Each leg has at each end at tab 334D, which projects outwardly beyond an edge 334E of the web. The outer edge of each leg 334B and 334C is received in a respective blade fit groove 331, so that each blade fit groove 331 receives the edges of two legs on respective adjacent contactor blades 334. The tabs 334D at opposite ends of the blades 334 each project under a respective one of the blade holder rings 332, and the blade holder rings 332 thus hold all of the contactor blades 334 in place on the piston.

Next, a fifth embodiment of the present invention will be described in detail with reference to FIGS. 18 to 21.

The piston 301 of the fourth embodiment includes a crown part 302, the skirt part 303 and the riveting disk 304 which unites the crown part 302 with the skirt part 303, and has same structures and same reference numerals as the third embodiment, so the description for them is omitted.

A number of blade fit grooves 331a are closely and longitudinally formed on the outer circumference of the skirt part 303, and ring two circumferential grooves 333a are formed near the upper and lower ends of the skirt so as to be circumferentially fitted with the blade fit rings 332a.

Each blade fit groove 331a of the skirt portion 303 is fitted with a contactor-spring 340 of wire.

Referring to FIG. 21, each contactor spring 340 is a piece of wire bent to have end portions 340A and 340B and a center portion 340C which are disposed in a respective blade fit groove 331a, and to have between the center portion 340C and each end portion 340A an engaging portion 340D or 340E which projects outwardly away from the piston. The end portions 340A and 340B are each disposed beneath a respective one of the blade fit rings 332a, in order to hold the contactor spring 340 on the piston.

Next, a sixth embodiment of the present invention will be described in detail with reference to FIGS. 22 to 27.

The piston 301 of the sixth embodiment includes the crown part 302, the skirt part 303 and a roll mount disk 350 which is used to unite the crown part 302 with the skirt part 303, and the same structures as in the second embodiment have the same reference numerals, so the description for them is omitted.

The skirt part 303 includes four roll train brackets 363 each pierced by two pin holes 362 to support contactor— rollers 360 rotatably on roll pivot pins 361, and a substantially "C" shaped fitting portion 364 is formed in each roll train bracket 363.

The roll mount disk 350 is insertedly and fixedly disposed in the "C" shaped fitting portions 364 of the roll train brackets 363, and has in the middle a hole 351. Four rivet holes 352 pierce the disk 350 in alignment with the rivet holes 309 of the crown part 302. Reference numeral 370 denotes a rivet having a center portion and having at each end an end projection 371 of smaller diameter, four of which are used to fix the crown part 302 to the roll mount disk 350 (FIG. 22) at regular intervals.

Figure 22:
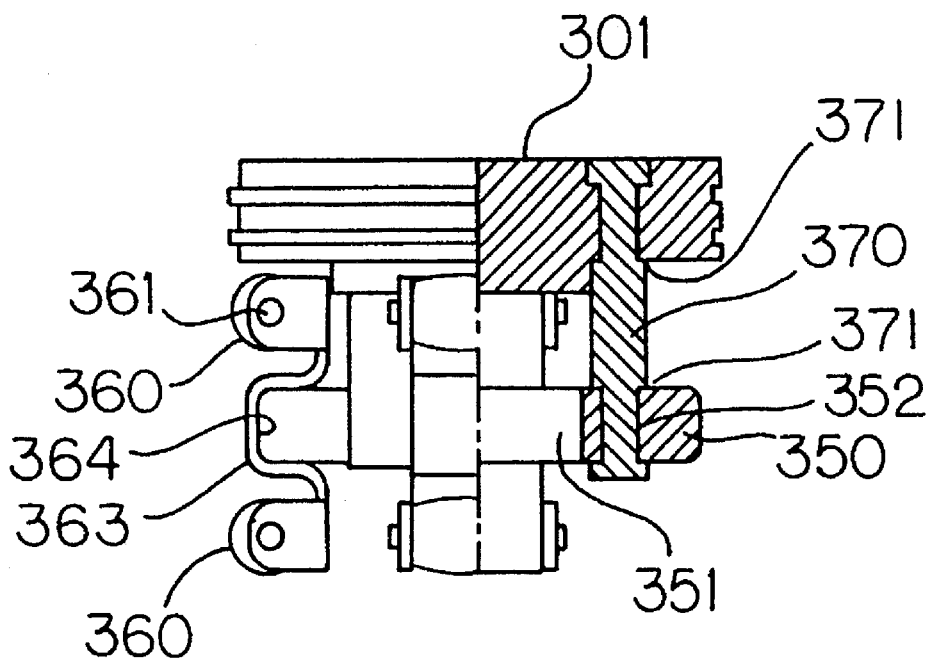
Figure 23:
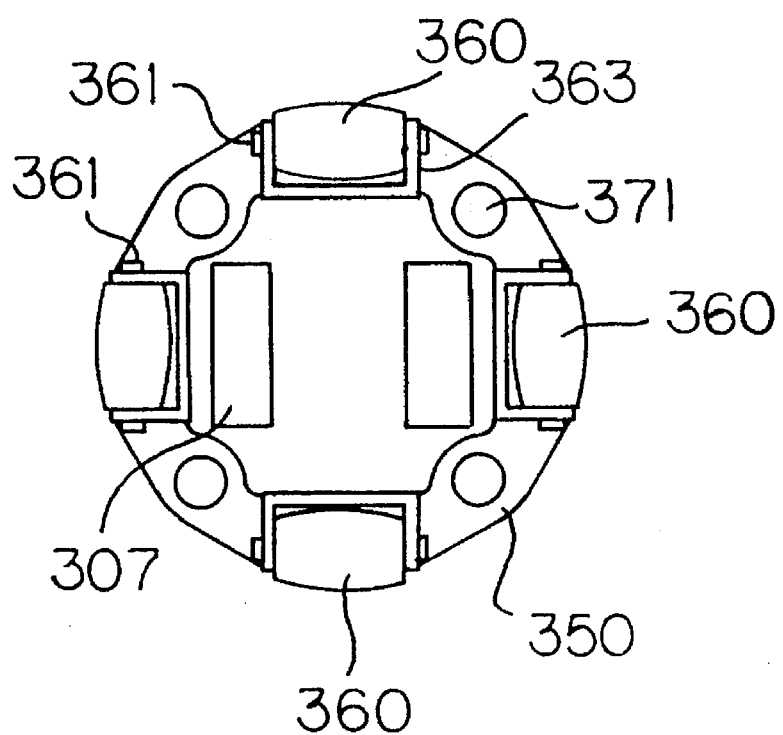
Figure 24A:
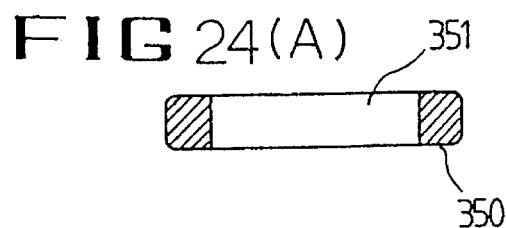
FIG. 24(A) is a sectional end view.
Figure 25:
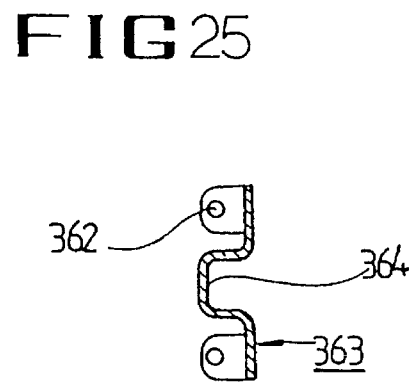
Figure 24B:
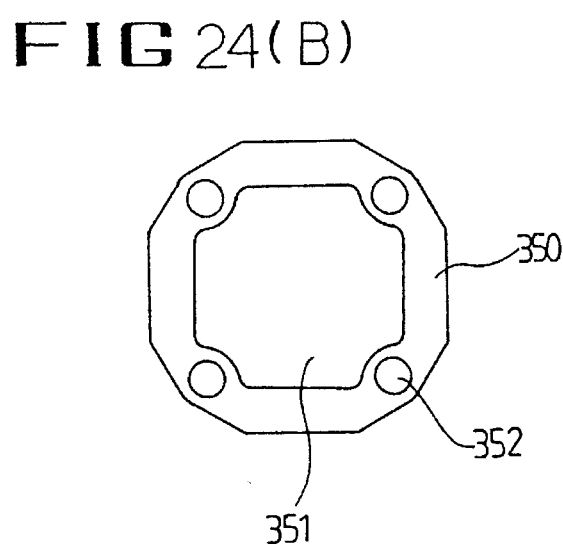
FIG. 24(B) is a top view.
Figure 26:
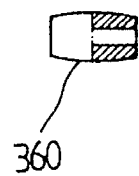
Figure 27:
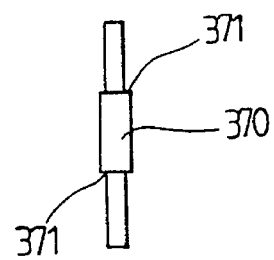

More specifically, with reference to FIG. 22, the four rivets 370 fixedly secure the roll mount disk 350 to the crown 302, so that the disk 350 is spaced below the crown 302. Four of the roll train brackets 363 are supported on the disk at equally angularly spaced intervals, each roll train bracket 363 having the "C" shaped fitting portion 364 gripping around an edge portion of the disk 350. Each roll train bracket 363 has above and below the disk 350 a portion bent to form a clevis, the clevis having pin holes 362 in each arm and having a horizontal roll pivot pin 361 extending between and disposed in the pin holes 362, a roller 360 being rotatably supported on each pivot pin 361. The upper and lower portions of each roll train bracket 363 have a small degree of flexibility, so that each clevis and the roller 360 supported by it can move approximately radially with respect to the piston 301. The arms 307 projecting downwardly from the crown 302 extend through the hole 351 in the disk 350.

Figure 28:
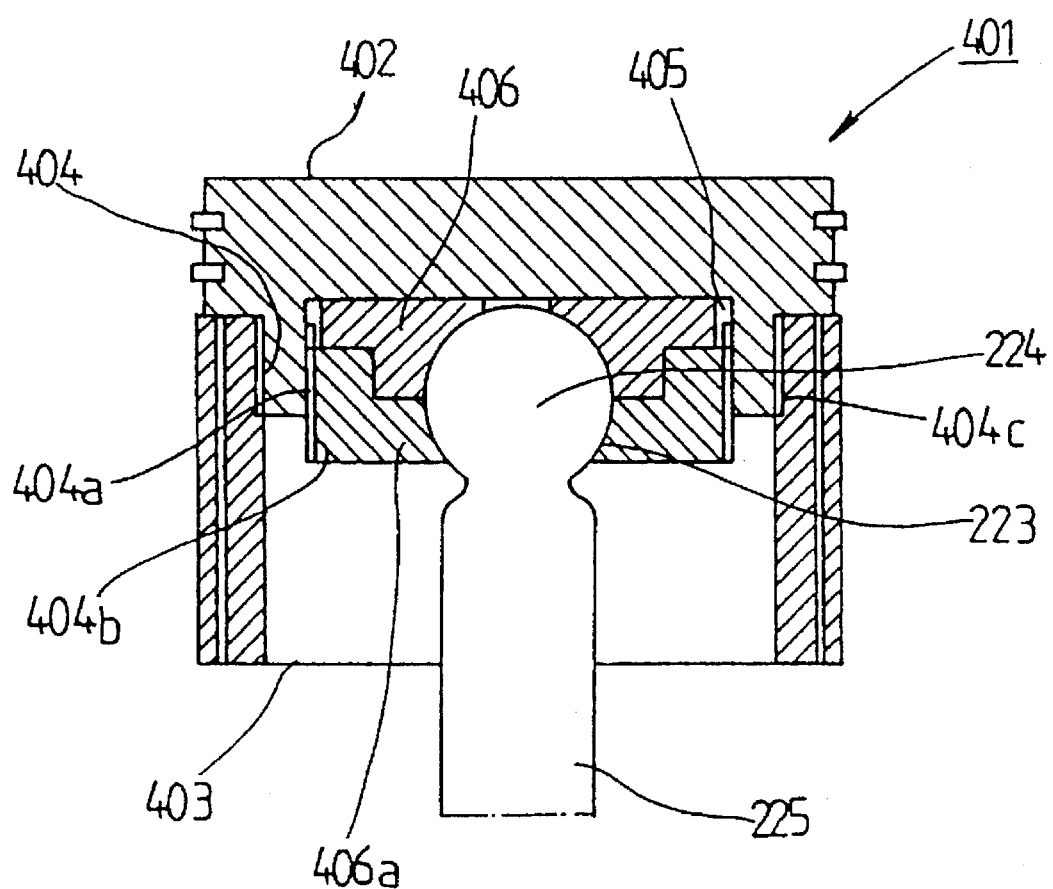
FIG. 28 is a sectional end view showing a seventh embodiment of the invention.
Figure 29:
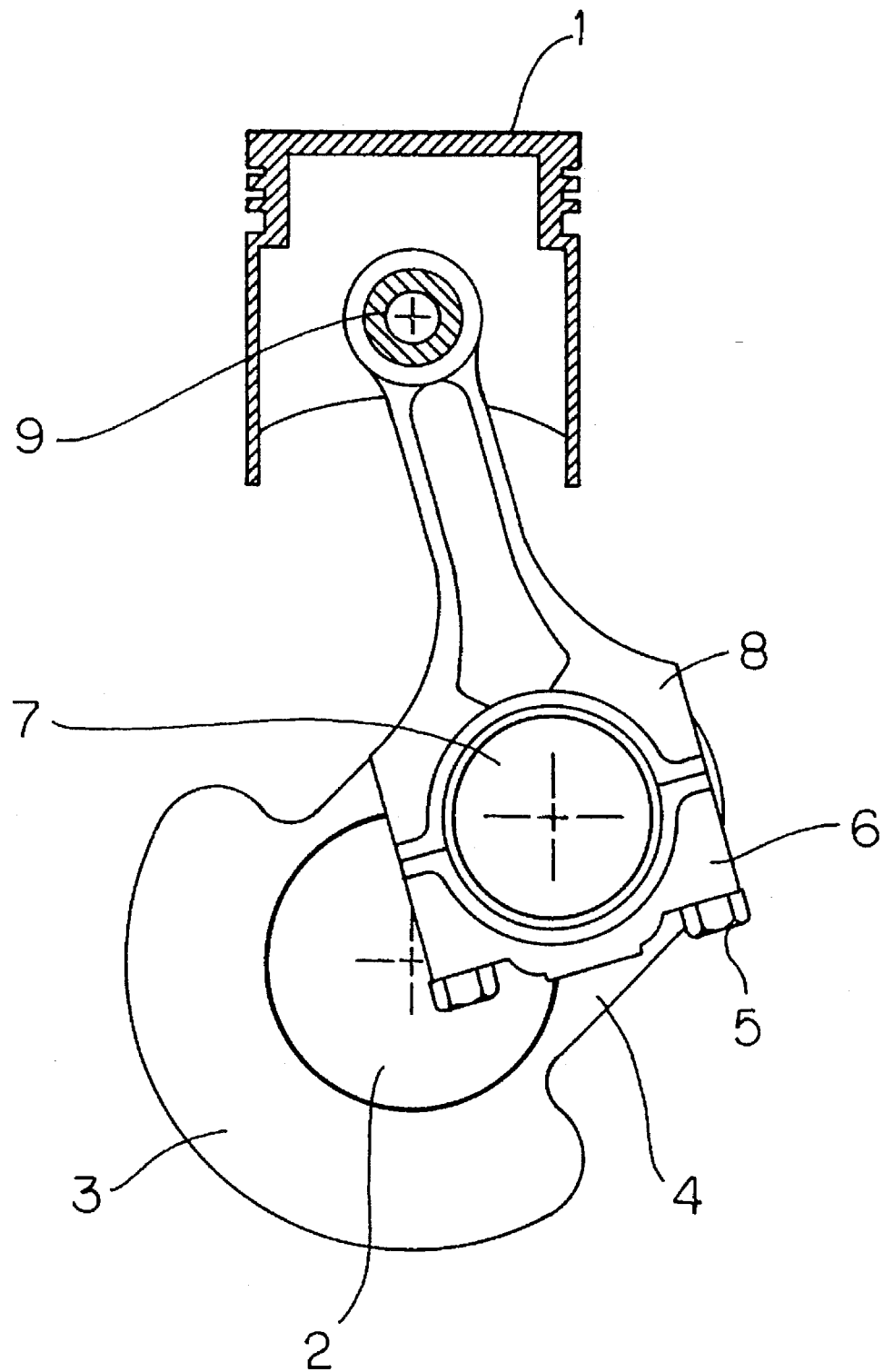
FIG. 29 is a sectional end view showing a conventional connecting rod.
Figure 30:
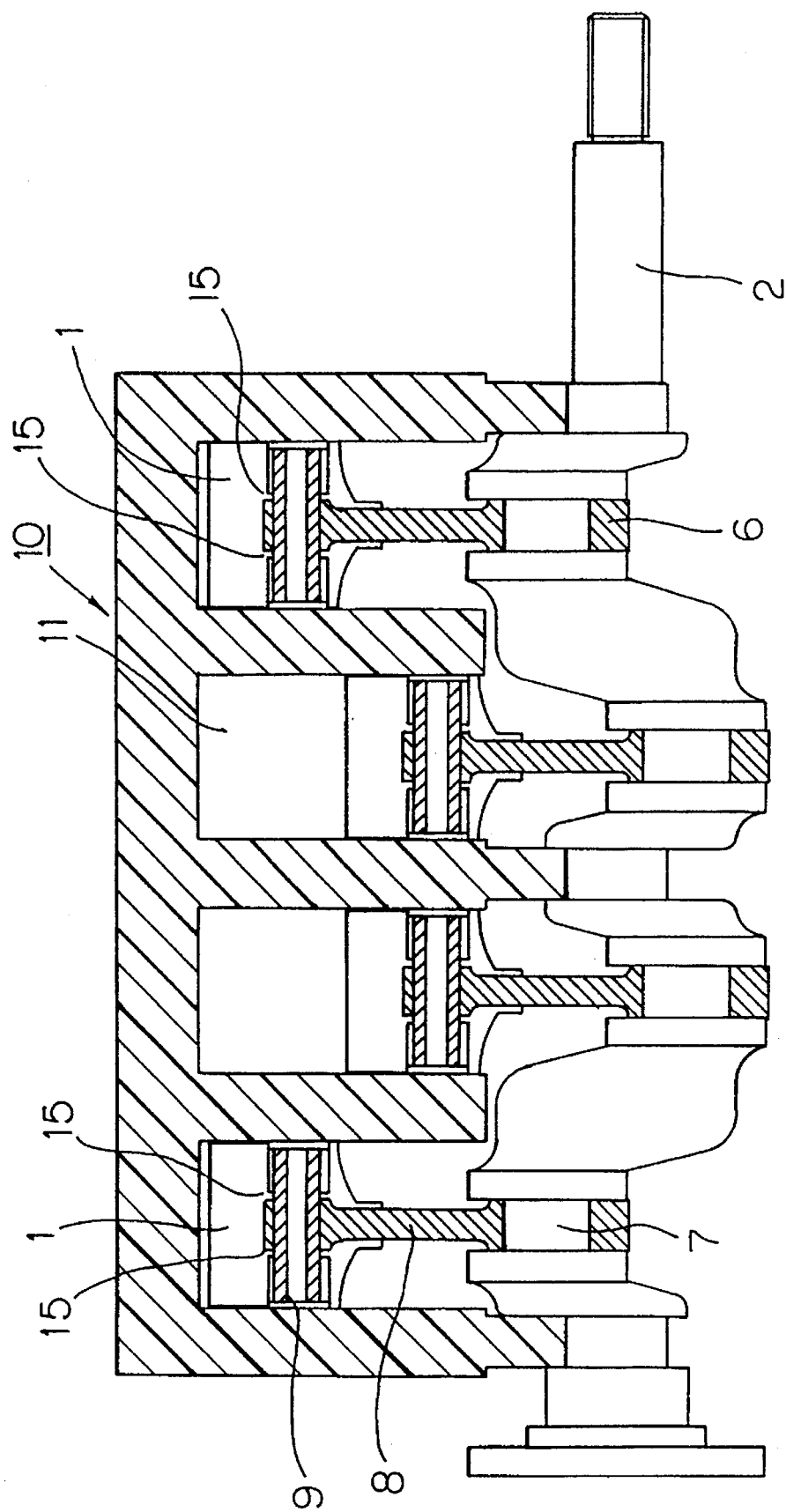
FIG. 30 is a sectional side view of a condition of use of the connecting rod of FIG. 29.

Next, a seventh embodiment of the present invention will be described in detail with reference to FIG. 28.

Reference numeral 401 denotes a piston. The piston 401 comprises a crown part 402, and a skirt part 403 which is integrally and fixedly threaded to the crown part.

Thread parts 404 and 404a are formed on the outer circumference and the inner circumference of the lower end on the crown part 402 of the piston 401. Upper and lower receptacles 406 and 406a are fitted in a gap 405 within the inner circumference of the piston, and a thread part 404b is formed on the outer circumference of the lower receptacle 406a to be cooperatively threaded with the thread part 404a.

A spider 225 has at one end a ball body 224 received movably within a groove or socket 223 between the upper and lower receptacles 406 and 406a.

The skirt part 403 is formed as in the skirt parts of the third, fourth and sixth embodiments. However, a thread part 404c on the inner circumference is formed to be threadedly engaged with the thread part 404 formed on the outer circumference on the lower end of the crown part 402.

Operation of the foregoing structures according to the present invention are described in detail below.

First, assembly according to the first embodiment will be described.

Figure 2:
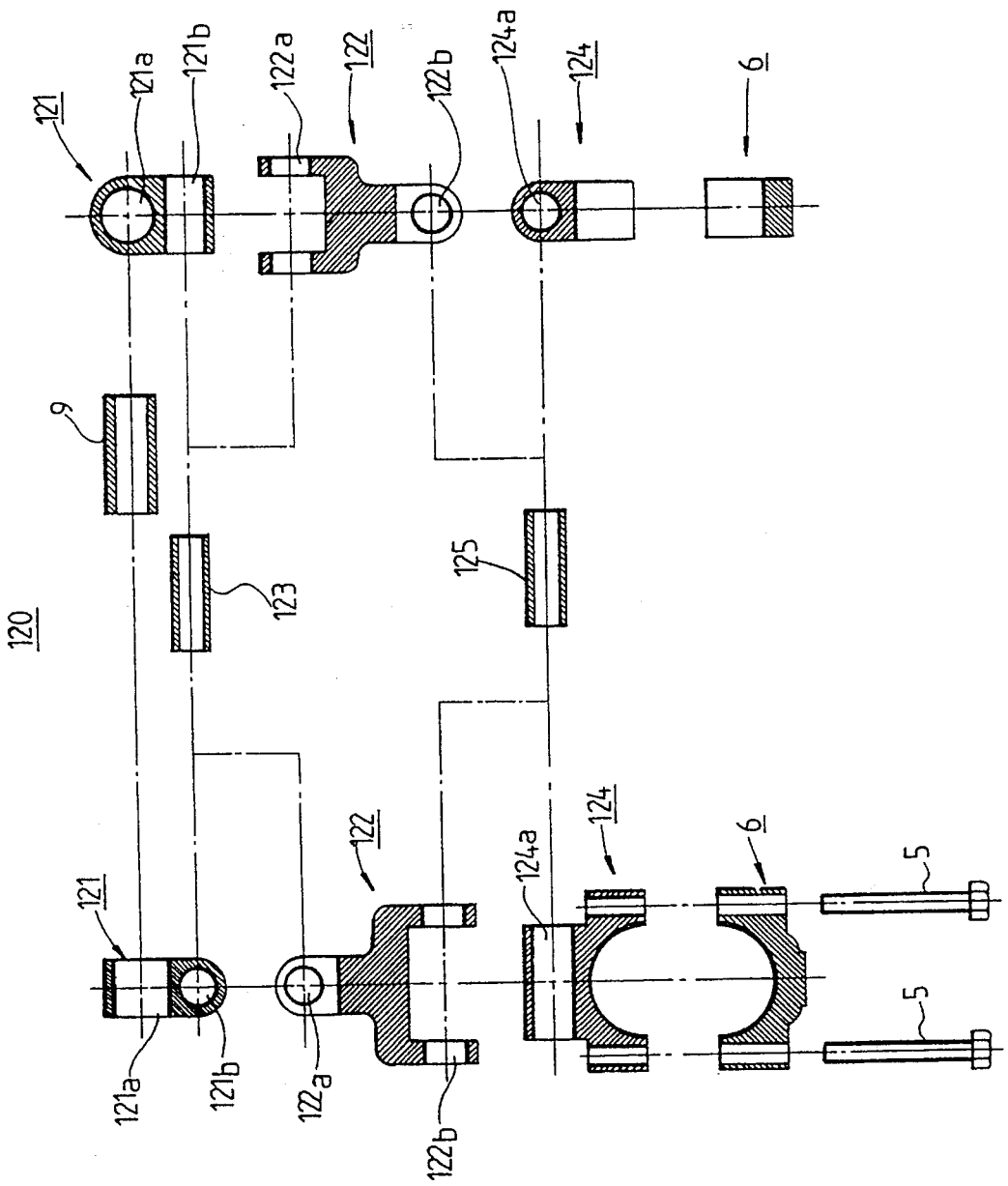
FIG. 2 is an exploded sectional end and side view of the apparatus of FIG. 1.
Figure 3:
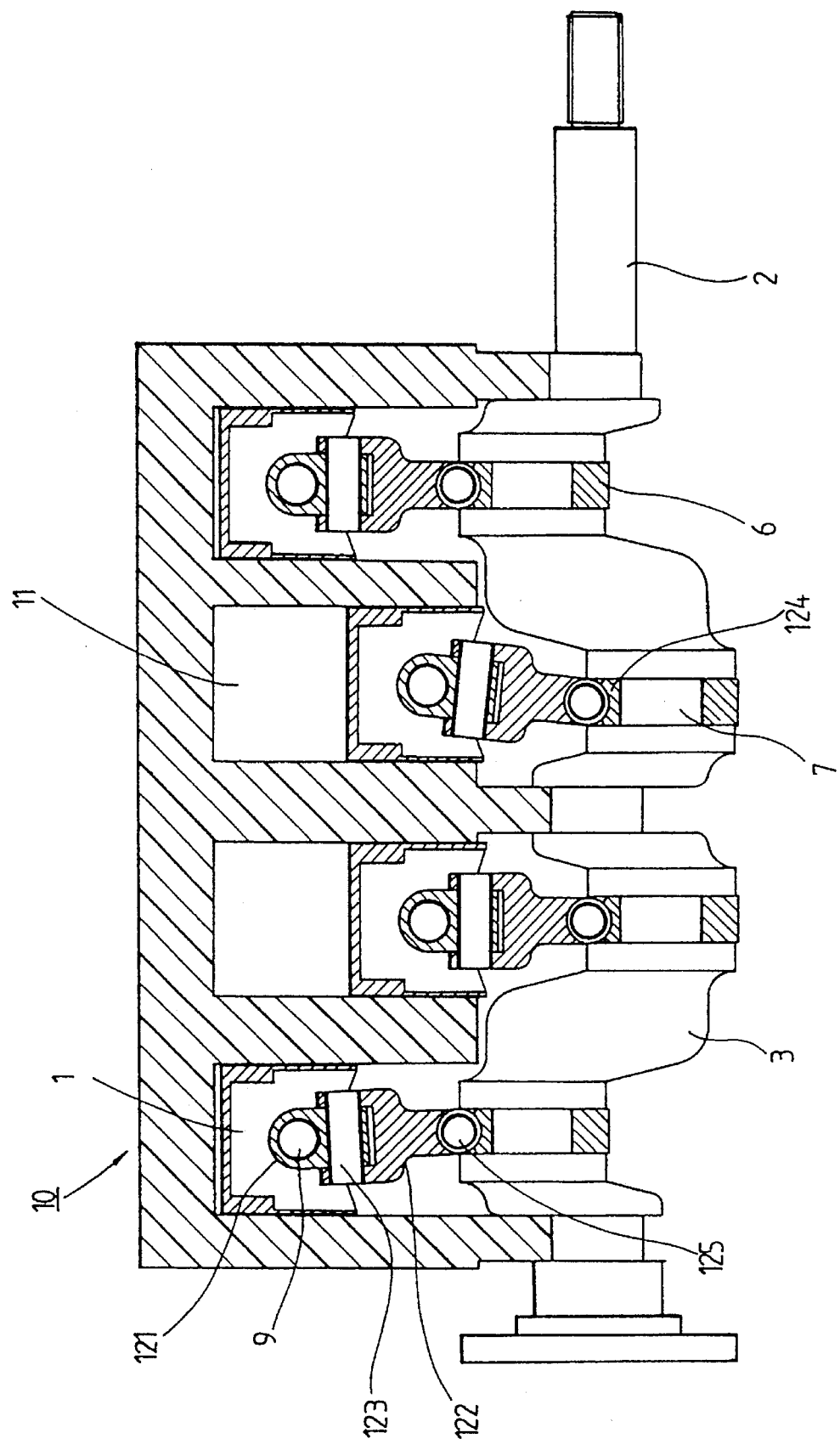
FIG. 3 is a sectional side view showing a condition of use for the apparatus of FIG. 1.

Referring to FIGS. 1–3, the upper pin hole 121a in the universal joint upper link 121 of the universal joint connecting rod 120 axially receives the piston pin 9 in the piston. 1 reciprocating within the cylinder 11 of the cylinder head 10, and the lower pin hole 121b of the universal joint upper link 121 and the upper pin hole 122a of the spider 122 axially receive the universal joint upper pin 123, and the lower pin hole 122b of the spider 122 and the upper pin hole 124a of the universal joint lower link 124 axially receive the universal joint lower pin 125.

The universal joint lower link 124 and the connecting rod cap 6 are pivotally fitted around the crank pin 7 of the crank shaft 2, and are fixedly clamped together with the connecting rod cap bolt 5.

Accordingly, the relative position error, which is not united with the relationships for the angle, the perpendicular and the horizontal between the piston 1 and the crank shaft 2, is compensated automatically.

As shown in FIG. 3, the cylinder head 10 and the crank shaft 2 as basic structures of the engine are completely assembled. However, the relative gaps (clearances) of four pistons 1 are not constant and the angles are shown for states in which the perpendicular relationships are not identical. By use of the universal joint connecting rod 120, all of the relative positions which erroneously take place in the internal combustion engine, such as abnormal gaps for the cylinder head 10, an abnormal position for the crank pin 7, torsion for the crank shaft 2, torsion for the universal joint connecting rod 120, abnormal angles for the crank pin 7, or abnormal angles for the main bearing journal, are completely compensated automatically, and all the components are smoothly operated.

Therefore, the gap between the cylinder 11 and the piston 1 can be minimized, and the noises and vibration due to strikes between the cylinder wall and the piston 1 are minimized. Although the pressure of the piston rings can be reduced enough by the minimum gap between the cylinder 11 and the piston 1, fuel leakage and penetration into the combustion chamber of the engine oil can be minimized, and fuel losses due to the friction of the piston rings is reduced. In addition, not only does the minimum pressure of the piston rings produce minimum abrasion of the machines, but also wastes of the pollutions such as exhaust gases can be minimized.

Further, as to the procedures for machining the inner diameter of the cylinder 11 in the cylinder head 10, which should be aligned very precisely for the central gaps of the four (or a plurality of) cylinders, problems are avoided.

Also, all charging costs are reduced in order to maintain the straightness and the true angles in the mutual positions for the central shaft of the cylinder 11 and the crank shaft 2.

The noises and wastes of fuel which normally take place due to the sliding gap or clearances are avoided between the connecting rod 120 and the piston 1 on the piston pin 9 (also in an extremely accessible case).

Also, owing to the significant reduction in the necessity to maintain a precise gap or clearance and mutually true parallelism for each crank pin 7 and the main bearing journal, which affects the machining procedures for the crank shaft 2 when only the crank pin 7 and the main bearing journal on their diameters are precisely machined, passed products can be provided and the yield of product is able to increase.

Two main bearings on both ends of four or five main bearings are able to exchange with the needle roll bearing instead of the both sides—aligning—united method as in the existing way, and a maximum load of the crank shaft 2 is replaced with the rolling bearing which is not provided with the siding friction.

Accordingly, fuel saving, noise reduction and significant improvement for the life of the machine can be accomplished.

Moreover, when the cylinder head is mounted, by the tension change of the clamped bolt and modifications of the cylinder block according to the aging of the gasket, impact, noise, smoke, and fuel waste are removed by the modifications of the connecting rod.

Next, the second embodiment (FIGS. 4–5) will be described in detail. The ball body 224 of the spider 225 for the ball joint connecting rod 220 is fixed with the fixed bolt 222a or a rivet, the piston 1 reciprocates within the cylinder 11 of the cylinder head 10, and the ball body 224 of the spider 225 swivels in the groove or socket 223 between the upper and lower receptacles 221 and 221a. After ball body 224 is inserted in the groove, the upper and lower receptacles 221 and 221a are secured with the fixing bolt 222. The lower pin hole 225a of the spider 225 is then aligned with the upper pin hole 226a of lower link 226, and then the lower pin 227 is axially inserted.

Thereafter, the lower link 226 and the connecting rod cap 6 are pivotally arranged around the crank pin 7 of the crank shaft 2 and are then clamped with the connecting rod cap bolt 5.

Accordingly, the relative position error, which is not suitable for the relationships between the angles, perpendicular and horizontal, is automatically compensated.

Figure 5:
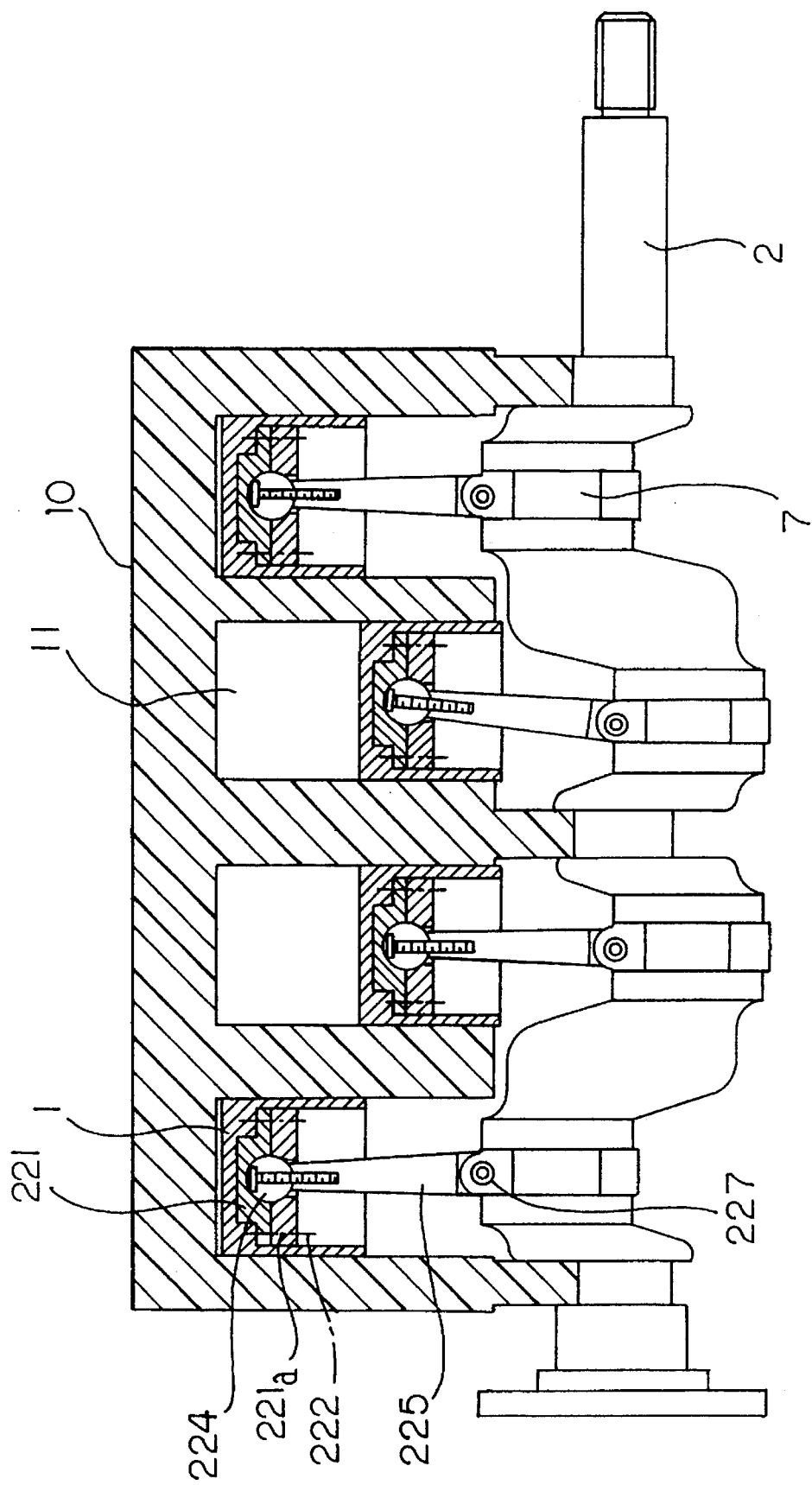
FIG. 5 is a sectional side view showing a condition of use for the second embodiment of FIG. 4.
Figure 6:
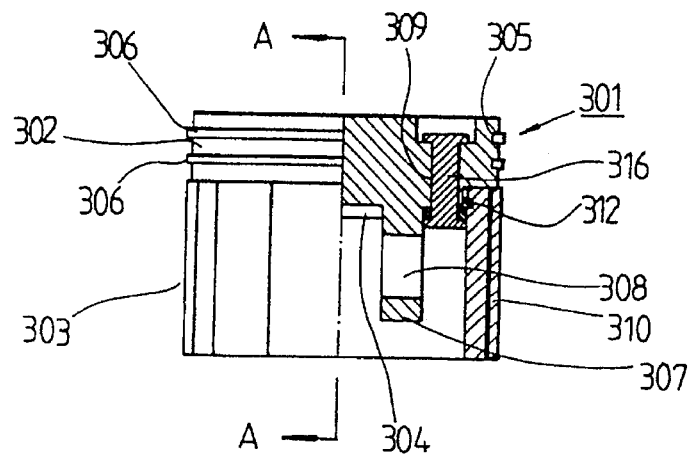
FIG. 6 is a partly sectional end view showing a third embodiment of the invention.
Figure 7:
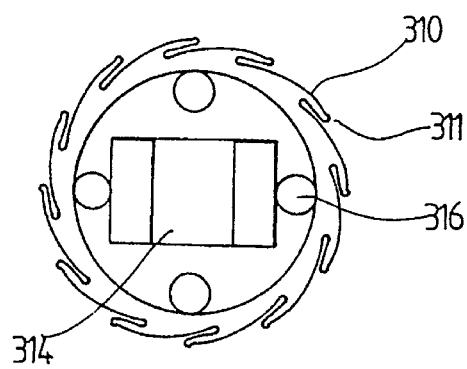
FIG. 7 is a bottom view of the apparatus of FIG. 6.
Figure 8:
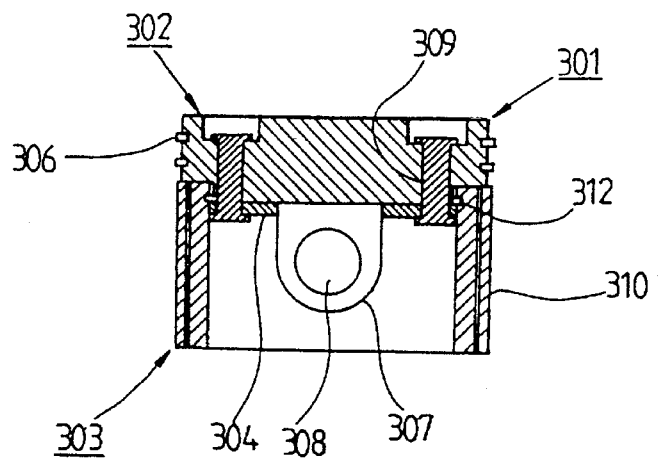
FIG. 8 is a sectional view taken along the line 8—8 of FIG. 6.
Figure 9A:
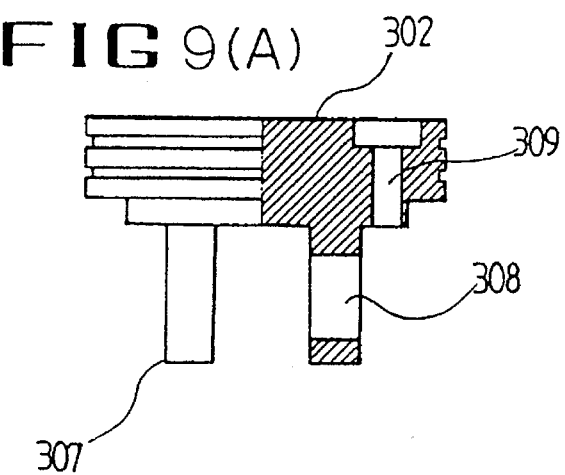
FIG. 9(A) is a partly sectional end view and FIG. 9(B) is a bottom view.
Figure 9B:
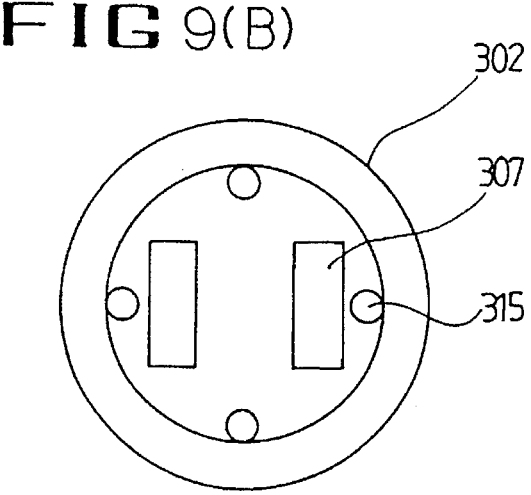
Figure 10:
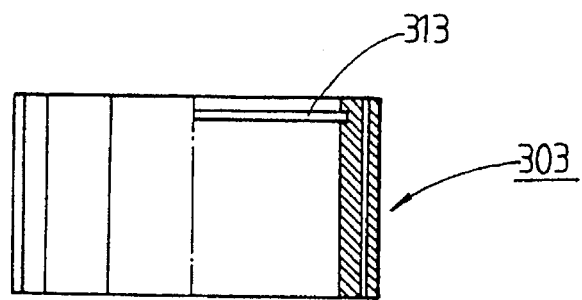
FIG. 10 is a partly sectional end view of a skirt part of the apparatus of FIG. 6.
Figure 11A:
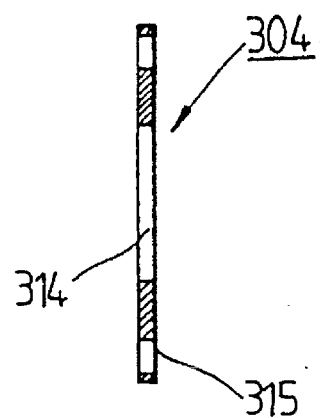
FIG. 11(A) is a cross sectional view.
Figure 11B:
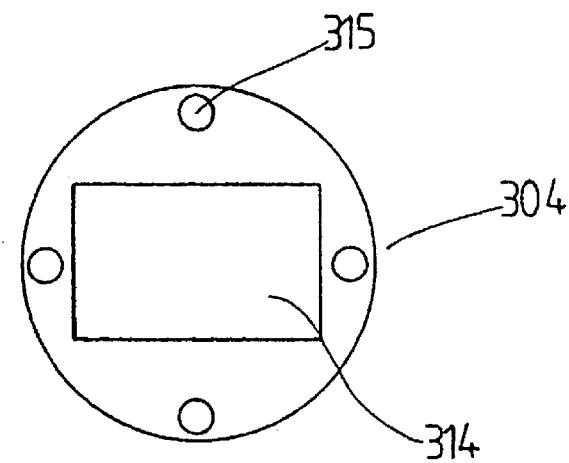
FIG. 11(B) is a top view.
Figure 12A:
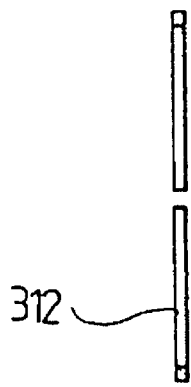
FIG. 12(A) is a cross sectional view.
Figure 12B:
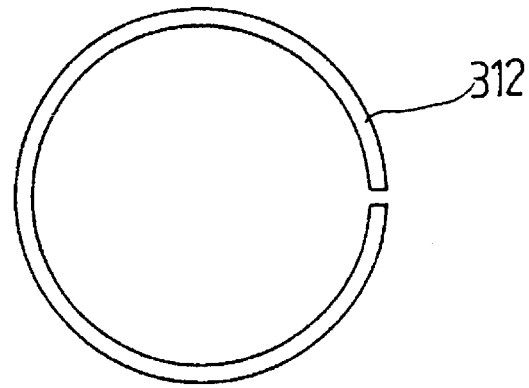
FIG. 12(B) is a plan view.
Figure 13:
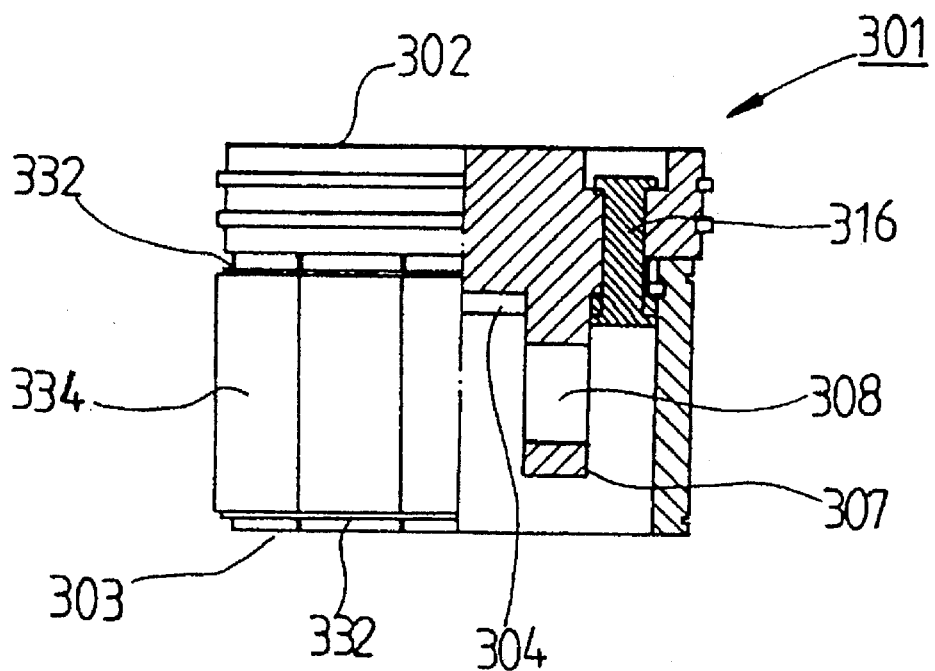

FIG. 5 shows the complete assembly of the cylinder head 10 and the crank shaft 2 as a basic structure of the internal combustion engine. However, four pistons 1 are not constant in the relative gaps or clearances for them, and the state which is not suitable for the relationships between the angle, perpendicular and horizontal, is shown.

By use of the ball joint connecting rod 220, all of the relative positions which erroneously take place within the internal combustion engine, such as an abnormal gap of the cylinder head 10, abnormal position of the crank pin 7, torsion of the crank shaft 2, torsion of the ball joint connecting rod 220, abnormal angle of the crank pin 7, or abnormal angle of the main bearing journal, are completely compensated automatically, and at the same time all components are smoothly operated.

Therefore, the gap or the clearance between the inner diameter of the cylinder 11 and the outer diameter of the piston 1 can be minimized, and noises and vibrations due to striking between the piston 1 and the cylinder wall are minimized.

Although the pressure of the piston rings is sufficiently reduced by minimization of the gap between the cylinder 11 and the piston 1, fuel leakage and penetration into the combustion chamber of the engine oil can be minimized, and fuel losses due to the friction of the piston rings can be reduced. By the minimization of pressure on the piston rings, not only the abrasion of the parts is minimized, but also wastes of the pollutions are minimized.

Further, on the procedures by which the inner diameter of the cylinder 11 is machined in the cylinder head 10, the problems associated with precisely positioning the central gaps of the four (or a plurality of) cylinders 11 are removed.

Also, all charging costs are reduced in order to maintain the straightness and the true angles for the mutual position between the crank shaft 2 and the central shaft of the cylinder 11.

In addition, the noises and wastes of fuels which take place due to sliding friction are completely removed, because the allowable gap or clearance is removed between the connecting rod 220 and piston 1 on the piston pin 9 (also in an extremely accessible case).

Owing to a significant reduction of the necessity to maintain a precise gap or clearance and mutual true parallelism for each crank pin 7 and the main bearing journal, which should be maintained in the machining procedures for the crank shaft 2 when only a diameter of the crank shaft 7 and only a diameter of main bearing journal are precisely machined, passed products can be provided and the yield of the products is able to increase.

Two main bearings on both ends of four or five main bearings are able to exchange with the needle—roll—bearing instead of the both sides—aligning—united method as in the existing way, and a maximum load of the crank shaft 2 is replaced with the rolling bearing which is not provided with the sliding friction.

Accordingly, fuel savings, noise reduction and significant improvement for the life of the machines can be accomplished.

Moreover, when the cylinder head is mounted, by the tension change of the clamped bolt and modifications of the cylinder block according to the aging of the gasket, impact, noise, smoke and fuel wastes are avoided by the modifications of the connecting rod.

Further, according to the present invention, also in use of the universal joint connecting rod or the ball joint connecting rod, it is natural that change from the rotation motion into straight line motion in the crank shaft or change from the straight line motion into the rotation motion in the piston is within the same range.

Next, the third embodiment (FIGS. 6–12) will be described in detail.

The clevis defined by arms 307, which is disposed within the skirt part 302 in the piston 301, is mounted on the crown part 302 provided on the upper portion in two sections to be divided from the piston 301. Accordingly, when the retractable devices are disposed on the skirt part 302 as the lower portion, the clevis is preferably provided with no obstacle.

In addition, on the upper end portion of the crown part 302, two or three grooves 305 are formed, if necessary, and piston rings 306 which are suitable for these grooves 305 are disposed in the grooves.

The clevis defined by arms 307 is integrally molded with the crown part 302. However, the clevis is pierced by the piston pin hole 308 to receive the piston pin (not shown) coupled with the universal joint type connecting rod (not shown).

Further, when the crown part 302 is connected with the skirt part 303, the size and number of rivet holes 309 is preferably determined according to the practical design and the size of the piston 301.

In addition, the skirt part 303 is preferably molded by extrusion with a metal which is as light as aluminum, is easy to machine, and is high in resistance against abrasion.

The inner circumference of the skirt part 303 is formed without any emboss and a thin and broad tension blade 310 is longitudinally formed on the outer circumference.

One side edge of the tension blade 310 is integrally formed with the skirt part 303 and is not moved.

A contactor ridge 311 on other side edge is formed free, and when the contactor ridge 311 is pressed, it moves toward the body of the skirt part 303.

Accordingly, all outer diameters of the skirt part 303 are retractable to be smaller than the free outer diameter.

When the piston 301 is assembled with the cylinder (not shown), by use of the proper tools, each tension blade 310 on the-skirt part 303 is urged inwardly and can be insertedly assembled into the cylinder, which has a smaller inner diameter than the free outer diameter of the piston.

When the tension blades 310 are disposed in the cylinder so the skirt part 303 is smaller than its original free diameter, each contactor ridge 311 is resiliently pushed against the cylinder wall with the externally extending force urging it to reach the free outer diameter of the tension blade 310.

Therefore, the force with which the contactor ridge 311 of the tension blade 310 on the skirt part 303 is pushed against the inner wall of the cylinder is enough to inhibit the tilt of the piston 301, but should be weak enough not to produce an influence on minor inhibition in the reciprocating movement of the piston 301.

In order to meet the above two contrary requirements, when the bending moment curve of the tension blade 310 passes a certain point, the section of the tension blade should be designed to be increased at an acute angle.

Further, in principle, the inner wall of the skirt part 303 is formed to be smoothly extruded without forming any emboss. The groove 313 is machined all around the inner diameter, and the preparation for assembly is finished by fitting the stop ring 312 in the groove 313.

Then, the riveting disk 304 is inserted within the inner circumference of the skirt part 303, and is to touch the stop ring 312. The bottom of the crown part 302 is attached to the stop ring 312, and each hole 315 in disk 302 is mutually aligned with a respective rivet hole 309.

After aligning, the rivets 316 are inserted and the head part of each rivet 316 is upset. With such procedures, the assembling of the piston 1 is completed.

Next, the fourth and fifth embodiments (FIGS. 13–17 and FIGS. 18–21) will be described in detail. The basic concept of the contactor blade 334 in the fourth embodiment and the contactor spring 340 in the fifth embodiment, and the tension structures on the skirt part 303, are completely the same as the tension blade 310 to be molded by extrusion.

However, in case the tension producing device has the tension blade 310 which is molded by extrusion, they have a solid type extruded metal.

On the other hand, the contactor blade 334 on the fourth embodiment and the contactor spring 340 on the fifth embodiment are a floating type formed sheet metal and a floating type wire metal. Accordingly, they are different points.

Figure 14:
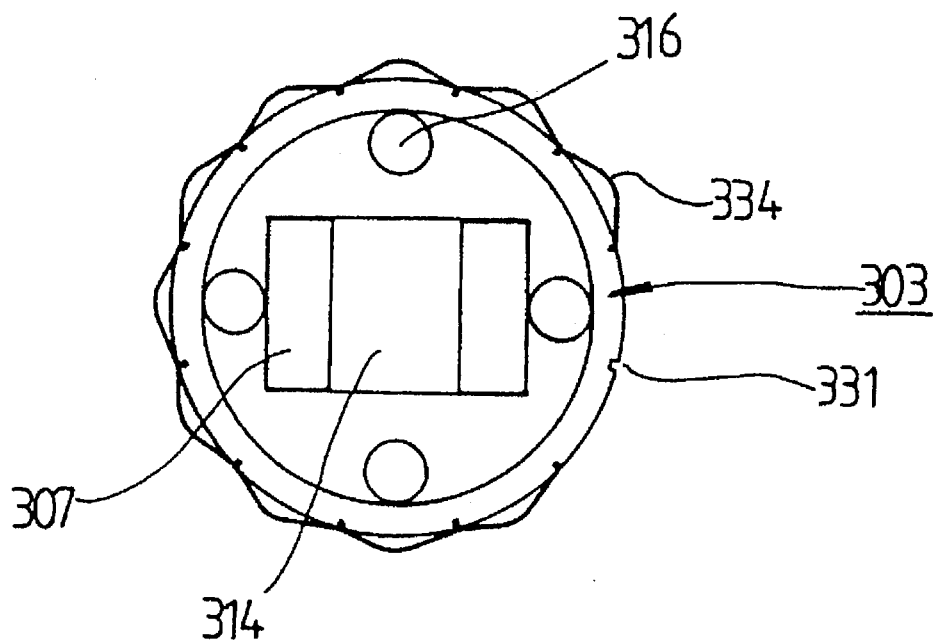
Figure 15A:
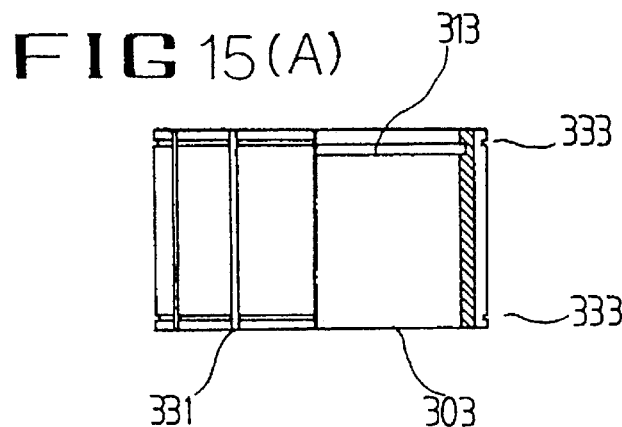
FIG. 15(A) is a partly sectional end view and FIG. 15(B) is a bottom view.
Figure 15B:
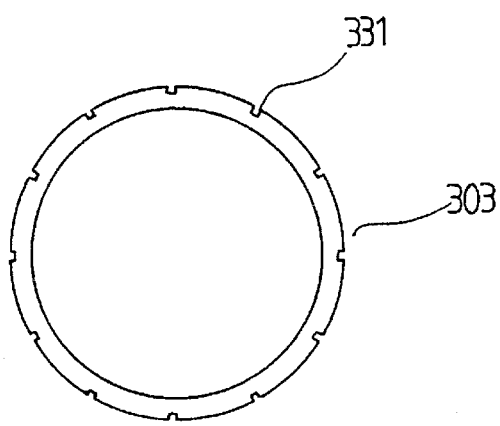
Figure 16A:
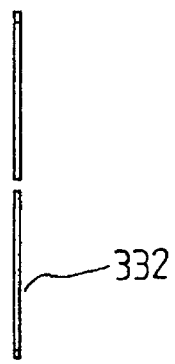
FIG. 16(A) is a cross sectional view.
Figure 16B:
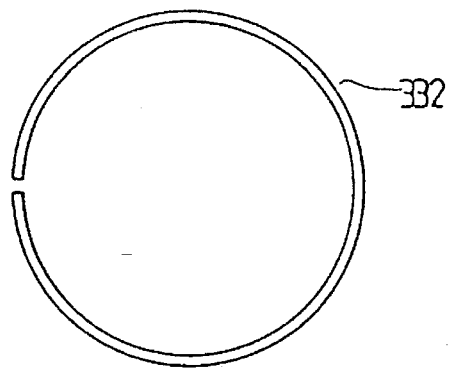
FIG. 16(B) is a top view.

Only spacings of the blade fit grooves 331 and 331a which support the blades or springs for the tension producing are different on the contactor blade type skirt part 303 in FIG. 14 and on the contactor spring type skirt part 303 in FIG. 19, and other parts have completely the same structures.

The spacing between the blade fit grooves 331 to be fitted with the contactor blades 334 is broad, but the spacing between the blade fit grooves 331a to be fitted with the contactor springs 340 is closely formed.

Further, the contactor blades 334 or the contactor springs 340 are fitted in the blade fit grooves 331 and 331a on the skirt part 303, and then the blade holding rings 332 and 332a are inserted in the ring grooves 333 and 333a formed on the outer circumference of the skirt part 303. The contactor blades 334 or the contactor springs 340 are prevented from slipping out of the blade fit grooves 331 and 331a by rings 332 or 332a.

The skirt part 303 is united with the crown part 302, using the rivet 316 as in the third embodiment. Accordingly, the assembly of the piston is completely accomplished.

Next, the sixth embodiment (FIGS. 22–27) of the present invention will be described in detail.

The skirt part 303 of the piston 301 is an aggregate of the contactor rollers 360, and the aggregate surface on the outer diameter surfaces of the contactor rollers 360 is to form the surface corresponding to the inner diameter of the cylinder.

Each contactor roller 360 is axially and rotatably disposed on one of the roll pivot pins 361 having ends in the pin holes 362 on the roll train bracket 363.

At this time, the outer diameter of the contactor roller 360 should be provided with the curved surface along the central shaft, and the radius of curvature is preferably the same as the radius of the cylinder inner diameter which contacts the contact roller 360.

Further, the plural roll train brackets 363 are manufactured, and are assembled by inserting substantially "C" shaped fixation part 364 of each roll train bracket 363 radially onto the roll mount disk 350. The outer diameter of the contactor rollers 360 is manufactured so that the aggregate surface defined by all rollers 360 is of larger outside diameter than the inner diameter of the cylinder to be assembled.

Next, when the skirt part 303 is inserted into the inner diameter of the cylinder, the contactor rollers 360 are preferably maintained by the proper force, with the cylinder holding the contact force.

Accordingly, the outer diameter parts of the contactor rollers 360 collectively form the outer diameter of the skirt part 303, and the contactor rollers 360 are carried out to maintain the contact pressure between the cylinder inner diameter and the skirt part 303. The contact is not a slip engagement, but is rolling engagement.

Further, after aligning each rivet hole 309 of the crown part 302 with a rivet hole 352 of the roll mount disk 350, the rivets 370 provided with the end projections 371 are fitted into the rivet holes 309 and 352 so as to maintain constant gaps.

And then, when the head part of each rivet 370 is upset, the assembly of the piston 301 is completely accomplished.

Finally, the seventh embodiment (FIG. 28) of the present invention is described in detail.

The crown part 402 of the piston 401 has the same shape as in the third, fourth and fifth embodiments of the present invention.

However, it is different to form the thread parts 404 and 404a on the outer circumference and the inner circumference of the lower end part of the crown part 402. Accordingly, into the space 405 of the crown part 402 is inserted the ball body 224 of the spider 225 of the ball joint connecting rod 220, and after inserting the ball body 224 in the groove or socket 223 of the upper and lower receptacles 406 and 406a, the upper and lower receptacles are inserted. At this time, when the thread 404a disposed on the inner circumference of the space part 405 and the thread part 404b set on the outer circumference of the lower receptacle 406a are mutually engaged, the spider 225 of the ball joint type connecting rod 220 is pivotally fitted on the lower end part of the crown part 402. Then the skirt part 403 is screwed onto the outer circumference of the crown part 402. The skirt part 403 is similar to the skirt part 303 in the third, fourth and fifth embodiments.

However, on the inner circumference, the thread part 404c is formed, and engages the thread 404 of the crown part 402. Accordingly, the piston 401 is completely assembled.

As described above, when the connecting rod, which is used in all the internal combustion engine and fluids compressor forming the piston and the crank shaft, includes the universal joint type connecting rod and the ball joint type connecting rod, although the relative position and straightness between the piston and crank shaft are deviated within a given range, the abnormal friction, noise and vibration never take place. Accordingly, not only are pollutions such as noise, vibration and wasted gases dramatically reduced, but also the fuels are significantly saved and the life of the machines are doubly increased.

With the final assembling using the rivet, welding or other method, the crown part is manufactured by the conventionally existing way and the skirt part is manufactured by the way of forming the solid type blade or a contactor blade or a metal contactor spring or an aggregate roller column on the outer circumference.

Accordingly, the outer diameter of the piston has expansion and tension, and when operated up and down within the cylinder the rocking motion is completely removed and, as a result of the removal, effects of strikes between the piston and the cylinder are avoided.

Although particular preferred embodiments of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A connecting rod for a reciprocating movement apparatus comprising an internal combustion engine with reciprocating movement, including:

a ball joint connecting rod to which is fixed a ball body movably disposed in a socket of upper and lower receptacles by screws fixed to a piston in a cylinder, the ball body being fixed to a spider by a fixed bolt, and a lower pin uniting an upper pin hole of a lower link with a lower pin hole of the spider;

the lower link and a connecting rod cap of the ball joint connecting rod being arranged around a crank pin of the crank shaft and being secured together by a connecting rod cap bolt, to automatically compensate relative position errors between the piston and the crank shaft.

2. A connecting rod for a reciprocating movement apparatus comprising a piston with reciprocating movement, including:

a ball joint connecting rod to which is fixed a ball body movably disposed in a socket of upper and lower receptacles fixed by screws to a piston in a cylinder, the ball body being fixed to a spider by a fixed bolt, and a lower pin uniting an upper pin hole of a lower link with a lower pin hole of the spider; and the lower link and a connecting rod cap of the ball joint connecting rod being arranged around a crank pin of the crank shaft and being secured together by a connecting rod cap bolt, to automatically compensate relative position errors between the piston and the crank shaft.

* * * * *